United States Patent Office 3,080,344
Patented Mar. 5, 1963

3,080,344
CROSS-LINKED COPOLYMERS OF SUBSTITUTED OXAZOLIDINONES
Wilhelm E. Walles, Midland, Mich., assignor to The Dow Chemical Company, Midland, Mich., a corporation of Delaware
No Drawing. Filed May 8, 1961, Ser. No. 108,267
9 Claims. (Cl. 260—77.5)

This invention relates to new compositions of matter. More particularly, this invention is concerned with novel polymeric materials containing oxazolidinone derivatives and certain polyethylenically unsaturated compounds.

This invention has as an object the provision of new and useful compositions of matter. A further object of this invention is the provision of polymeric materials having a community of properties making them more suitable for certain applications than polymers known before this invention. Another object of the present invention is the provision of copolymers of ring substituted N-alkenyl-2-oxazolidinones which copolymers possess valuable chemical and physical properties. Other objects and advantages of this invention will appear hereinafter.

These objects are accomplished in accordance with the present invention by providing copolymers of certain ring substituted N-alkenyl-2-oxazolidinones and certain polyethylenically unsaturated compounds. The substituted N-alkenyl-2-oxazolidinones have the general formula

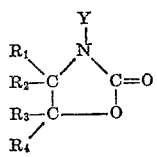

wherein Y is an acyclic alkenyl radical having from 2 to 3 carbon atoms i.e., the vinyl, propenyl, isopropenyl and allyl radicals and wherein at least one of $R_1$, $R_2$, $R_3$ and $R_4$ is a hydrocarbon radical free of ethylenic unsaturation and having from 1 to 7 carbon atoms, such as, the methyl, ethyl, propyl, cyclohexyl, phenyl and the tolyl radicals, the remaining R group or groups, if any, being hydrogen. Representative examples of such compounds are N-vinyl-4-methyl-2-oxazolidinone, N-vinyl-4-ethyl-2-oxazolidinone, N-vinyl-5-methyl-2-oxazolidinone, N-vinyl-5-ethyl-2-oxazolidinone, N-vinyl-4-cyclohexyl-2-oxazolidinone, N-vinyl-5-phenyl-2- oxazolidinone, N-isopropenyl-4,5-dimethyl-2-oxazolidinone, N-allyl-4,4,5,5-tetramethyl-2-oxazolidinone, N-propenyl - 4 - methyl-5-cyclohexyl-2-oxazolidinone, N-vinyl-4-p-tolyl-2-oxazolidinone. Of the oxazolidinones that can be employed to make the copolymers of this invention the N-vinyl variety, particularly the N-vinyl-5-alkyl-oxazolidinones, can be used advantageously. The N-vinyl-5-methyl- and the N-vinyl-5-ethyl-2-oxazolidinones are especially preferred.

The polyethylenically unsaturated compounds which can be used to make the compositions of the present invention by copolymerization with the N-alkenyl-2-oxazolidinones are cross-linking agents having at least two ethylenically unsaturated groups in non-conjugated relationship with each other. By the term "ethylenically unsaturated" is meant the structure

and is to be distinguished from benzenoid unsaturation. Groupings which contain ethylenic unsaturation include the vinyl, allyl, propenyl, isopropenyl, acrylate, acrylamido and methacrylate groupings. Representative specific examples of cross-linking agents which can be used to make the copolymers of this invention are ortho-divinylbenzene, meta-divinylbenzene, para-divinylbenzene, divinyl ether, the divinyl ether of ethylene glycol, the divinyl ether of diethylene glycol, the divinyl ether of triethylene glycol, the divinyl ether of tetraethylene glycol, the divinyl ether of glycerol, the trivinyl ether of glycerol, tris(allyl) citrate, allyl acrylate, diallyl adipate, diallylamine, diallyl diglycolate, diallyl fumarate, diallyl homophthalate, diallyl itaconate, diallyl maleate, diallyl malonate, diallyl oxalate, diallyl phthalate, diallyl isophthalate, diallyl terephthalate, diallyl sebacate, diallyl melamine, diallyl succinate, hexamethylene-bis-acrylamide, N,N-diallylacrylamide, N,N-diallylmethacrylamide, glyceryl trimethacrylate, N,N-methylene-bis-acrylamide, triallyl aconitate, triallyl cyanurate, divinyl sulfide, 1,4-divinyl-2,3,5,6-tetrachlorobenzene, ethylene glycol dimethacrylate, para-isopropenylstyrene, vinyl acrylate and vinyl chlorovinyl ether.

The new polymers can be produced by emulsion, or solution polymerization or by any conventional polymerization technique. Advantageously the copolymers of the present invention are produced by reacting the comonomer materials in a confined zone in the presence of small amounts of suitable catalysts such as $\alpha,\alpha'$-azobis (isobutyronitrile), benzoylperoxide and the like. The materials are preferably agitated slowly during the polymerization reaction.

In accordance with the present invention polymers having molecular weights in excess of 5000 and up to several millions or more are provided which contain in polymerized form at least about 80 percent of the N-alkenyl-2-oxazolidinone derivatives and from 0.001 percent to about 20 percent of the polyethylenically unsaturated compounds hereinabove referred to.

The polymers of this invention are water insoluble but are water swellable, the degree of swellability being an inverse function of the amount of cross-linking agent in the polymer molecule.

Because of the nature of the copolymers of this invention they find use in a number of applications. They can be used as beer clarifiers and for the purification of water. For example, the copolymers of this invention can be used in place of activated charcoal in processes for the removal of phenolic type materials from industrial waste water.

The following examples are illustrative of the present invention but the invention is not limited to the specific details thereof. Throughout the specification, including the examples which follow, all parts and percentages are parts and percentages by weight unless otherwise specified.

Example I

Three thousand grams of absolute alcohol are placed in a flask equipped with a stirrer, thermometer, reflux condenser and a separatory funnel. The alcohol is heated to a temperature of about 72° C. A mixture of 900 grams of N-vinyl-5-methyl-2-oxazolidinone (VOM), 100 grams of the divinyl ether of diethylene glycol (DVEDEG), and 10 grams of $\alpha,\alpha'$-azobis(isobutyronitrile) are placed in the separatory funnel and introduced dropwise over a period of 3 hours into the alcohol contained within the flask and maintained at a temperature of between 70° and 73° C. during the 3 hour period. The comonomers react almost quantitatively. A precipitate forms almost immediately after the beginning of the dropwise addition of the comonomer-catalyst mixture to the hot alcohol. The precipitate, a copolymer of 90 percent N-vinyl-5-methyl-2-oxazolidinone/10 percent divinyl ether of diethylene glycol, determined by material balance and infrared analysis, is recovered as a white powder from the reaction medium by filtration and drying in a vacuum oven.

This copolymer can be used in beer clarification. For example, 1 gram of the copolymer is added to 100 cubic centimeters of commercially available canned beer at room temperature and the mixture is stirred. Flocks of the cross-linked swollen copolymer become covered with a brown precipitate. The beer is filtered to remove the copolymer and chilled to a temperature of 0° C. No chill haze was observed in the so treated beer. In contrast, an untreated sample of the same beer (straight from the can) becomes hazy when cooled to 0° C.

*Example II*

A copolymer containing 90 percent N-vinyl-5-methyl-2-oxazolidinone and 10 percent of the divinyl ether of diethylene glycol as determined by material balance and infrared analysis is prepared in pilot plant quantities in the following manner: A mixture of 9 pounds of N-vinyl-5-methyl-2-oxazolidinone, 1 pound of diethylene glycol divinyl ether and 45 grams of $\alpha,\alpha'$-azobis(isobutyronitrile) are added dropwise to 40 pounds of hot (80° C.) dioxane. The precipitated copolymer is separated from the dioxane by filtration and is dried in a vacuum to remove volatiles. The monomeric materials are found to have reacted substantially quantitatively. The copolymer of this example can be used for the clarification of beer and for the purification of industrial waste water by the removal of phenolic material therefrom.

In a manner similar to the foregoing examples, copolymers can be made containing at least about 80 percent of any of the hereinabove identified class of N-alkenyl-2-oxazolidinone derivatives and from 0.001 percent to about 20 percent of any of the above defined class of cross-linking agents. Such are useful in the same manner and for the same purposes as the copolymers of the above examples. For example, a copolymer of 99 percent N-vinyl-5-ethyl-2-oxazolidinone (VOE) and 1 percent m-divinylbenzene is made by reacting a mixture of these comonomers with $\alpha,\alpha'$-azobis(isobutyronitrile) in a manner similar to that of Example I, and a copolymer of 80 percent N-vinyl-4,5-dimethyl-2-oxazolidinone (VODM) and 20 percent divinyl ether of diethylene glycol is made by the dropwise addition of a mixture of 80 percent VODM, 20 percent DVEDEG and a small amount of an azo-catalyst to hot dioxane in the manner of Example II.

Since departures can be made from the manner of making and using the copolymers of this invention it is intended that invention not be limited by the specific details thereof herein described.

That which is claimed is:

1. A composition of matter comprising a copolymer of an N-alkenyl-2-oxazolidinone having the general formula

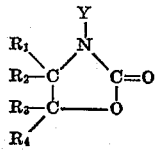

wherein Y is an acyclic alkenyl radical having from 2 to 3 carbon atoms and wherein each of $R_1$, $R_2$, $R_3$ and $R_4$ is independently selected from the group consisting of hydrogen, and organic hydrocarbon radicals free of ethylenic unsaturation having from 1 to 7 carbon atoms, at least one of $R_1$, $R_2$, $R_3$ and $R_4$ being one of said organic radicals, with a small amount of an organic cross-linking agent having at least two ethylenically unsaturated groups in non-conjugated relationship with each other.

2. A composition of matter according to claim 1 in which the N-alkenyl-2-oxazolidinone is N-vinyl-5-methyl-2-oxazolidinone.

3. A composition of matter according to claim 1 in which the N-alkenyl-2-oxazolidinone is N-vinyl-5-ethyl-2-oxazolidinone.

4. A composition of matter according to claim 1 in which the cross-linking agent is the divinyl ether of diethylene glycol.

5. A composition of matter according to claim 1 in which the cross-linking agent is divinylbenzene.

6. A composition of matter according to claim 2 in which the cross-linking agent is divinylbenzene.

7. A composition of matter according to claim 2 in which the cross-linking agent is the divinyl ether of diethylene glycol.

8. A composition of matter comprising a copolymer of at least about 80 percent of an N-alkenyl-2-oxazolidinone having the general formula

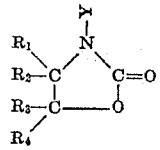

wherein Y is an acyclic alkenyl having from 2 to 3 carbon atoms and wherein $R_1$, $R_2$, $R_3$ and $R_4$ are independently selected from the group consisting of hydrogen, and organic hydrocarbon radicals free of ethylenic unsaturation having from 1 to 7 carbon atoms, at least one of $R_1$, $R_2$, $R_3$ and $R_4$ being one of said organic radicals with from 0.001 percent to about 20 percent of an organic cross-linking agent having at least two ethylenically unsaturated groups in non-conjugated relationship with each other.

9. A composition of matter comprising a copolymer of about 90 percent N-vinyl-5-methyl-2-oxazolidinone with about 10 percent of the divinyl ether of diethylene glycol.

References Cited in the file of this patent

UNITED STATES PATENTS

| | | |
|---|---|---|
| 2,818,399 | Dreschel | Dec. 31, 1957 |
| 2,919,279 | Walles et al. | Dec. 29, 1959 |
| 2,952,668 | Ehlers | Sept. 13, 1960 |